United States Patent
King et al.

(10) Patent No.: US 9,055,620 B1
(45) Date of Patent: Jun. 9, 2015

(54) CONSOLIDATION OF LAMP POWER CONVERSION AND EXTERNAL COMMUNICATION CONTROL

(75) Inventors: Eric J. King, Dripping Springs, TX (US); John L. Melanson, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 121 days.

(21) Appl. No.: 13/354,120

(22) Filed: Jan. 19, 2012

Related U.S. Application Data

(60) Provisional application No. 61/434,239, filed on Jan. 19, 2011.

(51) Int. Cl.
*H05B 37/02* (2006.01)
*H04B 3/54* (2006.01)

(52) U.S. Cl.
CPC ............ *H05B 37/02* (2013.01); *H05B 37/0263* (2013.01); *H04B 3/542* (2013.01); *H04B 3/544* (2013.01)

(58) Field of Classification Search
CPC .... H04B 3/542; H04B 3/544; H05B 33/0815; H05B 33/0845; H05B 37/0263
USPC .......................... 315/129–136, 209, 294, 307; 340/538–538.17
See application file for complete search history.

(56) References Cited

U.S. PATENT DOCUMENTS

| | | | |
|---|---|---|---|
| 4,672,300 A * | 6/1987 | Harper ........................... | 323/222 |
| 5,962,989 A * | 10/1999 | Baker ............................ | 315/294 |
| 6,225,759 B1 * | 5/2001 | Bogdan et al. ................. | 315/291 |
| 6,426,599 B1 * | 7/2002 | Leeb .............................. | 315/224 |
| 6,545,431 B2 * | 4/2003 | Hui et al. ........................ | 315/291 |
| 6,608,552 B1 * | 8/2003 | Fogel et al. ................. | 340/12.32 |
| 7,880,638 B2 * | 2/2011 | Veskovic et al. ............... | 340/4.3 |
| 8,076,920 B1 * | 12/2011 | Melanson ...................... | 323/299 |
| 8,207,635 B2 * | 6/2012 | Covaro ......................... | 307/112 |
| 8,217,589 B2 * | 7/2012 | Endres et al. ................. | 315/306 |
| 8,274,232 B2 * | 9/2012 | Nerone ..................... | 315/209 R |
| 8,331,796 B2 * | 12/2012 | Wernars et al. ............... | 398/172 |
| 8,543,226 B2 * | 9/2013 | Shah et al. ...................... | 700/22 |
| 8,569,972 B2 * | 10/2013 | Melanson ..................... | 315/307 |
| 8,610,365 B2 * | 12/2013 | King et al. .................... | 315/246 |
| 8,611,107 B2 * | 12/2013 | Chapman et al. .......... | 363/21.04 |
| 2006/0022214 A1 * | 2/2006 | Morgan et al. .................. | 257/99 |
| 2009/0160627 A1 * | 6/2009 | Godbole .................. | 340/310.11 |
| 2010/0084985 A1 * | 4/2010 | Woytowitz .................... | 315/210 |
| 2013/0271038 A1 * | 10/2013 | Shah et al. .................... | 315/307 |

* cited by examiner

*Primary Examiner* — Jason M Crawford
*Assistant Examiner* — Nelson Correa
(74) *Attorney, Agent, or Firm* — Terrile, Cannatti, Chambers & Holland, LLP; Kent B. Chambers

(57) ABSTRACT

A lighting system includes one or more methods and systems to control an input switching stage of a power converter to provide power for a lamp and modulate a line current supplied to the power converter to carry data related to a state of the lamp. In at least one embodiment, a single controller consolidates the functions of controlling an input stage of the power converter and communicating to an external device by modulating the line current supplied to the power converter to carry data related to a state of the lamp. The particular type of current modulation and communication protocol utilized by the consolidated power conversion-communication controller is a matter of design choice. In at least one embodiment, the lamp includes one or more electronic light sources, such as one or more light emitting diodes (LEDs) and/or one or more compact fluorescent lamps (CFLs).

36 Claims, 8 Drawing Sheets

CONSOLIDATION OF LAMP POWER CONVERSION AND EXTERNAL COMMUNICATION CONTROL

CROSS-REFERENCE TO RELATED APPLICATION

This application claims the benefit under 35 U.S.C. §119(e) and 37 C.F.R. §1.78 of U.S. Provisional Application No. 61/434,239, filed on Jan. 19, 2011, and is incorporated by reference in its entirety.

BACKGROUND OF THE INVENTION

1. Field of the Invention

The present invention relates in general to the field of electronics, and more specifically to a method and system for consolidation of lamp power conversion and external communication control using current modulated by an input switching stage of the lamp.

2. Description of the Related Art

Lighting systems continue to advance. For example, protocols and specialized communication hardware have been developed and placed within lamps to allow communication between lamps and a central communication system. The communication systems facilitate monitoring, controlling, informing, and automating the delivery and use of energy.

FIG. 1 depicts a lighting system 100 that includes lamps 102.1-102.N that each includes a respective, dedicated communication controller 104.1-104.N. "N" is an index integer representing a total number of lamps. The lighting system 100 receives an AC supply voltage $V_{IN}$ from voltage supply 106. The supply voltage $V_{IN}$ is, for example, a nominally 60 Hz/110 V line voltage in the United States of America or a nominally 50 Hz/220 V line voltage in Europe and the People's Republic of China. The lighting system also includes a central communication processor 108. The communication controllers 104.1-104.N exchange data with the central communication processor 108 to facilitate monitoring, controlling, informing, and automating the delivery and use of energy by the lamps 102.1-102.N.

FIG. 2 represents an exemplary supply voltage $V_{IN}$ waveform 202 and input current $i_{IN}$ waveform 204. Referring to FIGS. 1 and 2, the communication controllers 104.1-104.N are dedicated controllers for exchanging data with the central communication processor 108. The communication controllers 104.1-104.N exchange data with the central communication processor 108 in accordance with a specific data transfer protocol such as ZigBee or X10. "X10" is an international, open industry standard for communication among electronic devices used for home automation. Using the X10 protocol, data is transmitted within 200 μsecs of the zero crossings, such as zero crossings 206 and 208, of the supply voltage $V_{IN}$. In at least one embodiment, an X10-based communication controller 106 transmits data representing a logical one using 1 msec, 120 kHz digital data transmission pulses 206 and 208. Logical zeros are indicated by the lack of a pulse at zero crossing of the supply voltage $V_{IN}$. The data pulses are transmitted to the central communication processor 108 via power lines 110 and 112. ZigBee-based communication controllers 104.1-104.N exchange data with the central communication processor 108 using wireless transceivers (not shown). In another embodiment, the lamps 102.1-102.N exchange data with the central communication processor 106 via optional serial data lines 113.1-113.N.

Lamps 102.1-102.N also include respective power controllers 114.1-114.N. The communication controllers 104.1 and 104.N provide data to the power controllers 114.1-114.N that indicates various power settings, and the power controllers 114.1-114.N control power within the lamps 102.1-102.N. For example, when the central communication processor 108 generates command data to turn light sources 116.1-116.N ON, the communication controllers 104.1-104.N receive and decode the command data and notify the respective power controllers 114.1-114.N to turn the light sources 116.1-116.N ON.

FIG. 3 depicts a lamp 300, which represents one embodiment of each of the lamps 102.1-102.N. The lamp 300 includes a light source 302, such as an incandescent light bulb. The communication controller 304 transmits and receives data from the central communication processor 108 (FIG. 1) either through the power lines 110 and 112 or via antenna 306. If the central communication processor 108 issues a power related command, the communication controller 304 passes the command to the power controller 308. The power controller 308 then complies with the command by, for example, operating switch 310 to terminate and restore power to light source 302, thus, respectively turning light source 302 ON and OFF. Additionally, lamp 300 includes a sensor 310 that can provide sensed data, such as temperature data, to communication controller 304. The communication controller 304 then transmits the sensed data to the central communication processor 108.

Thus, lighting systems are able to communicate with a central communication controller. However, the lighting systems utilize a separate, dedicated communication controller to provide communications with the central communication controller.

SUMMARY OF THE INVENTION

In one embodiment of the present invention, an apparatus includes a controller capable of controlling an input switching stage of a power converter to provide power for a lamp. The controller is further capable of modulating a line current supplied to the power converter to carry data related to a state of the lamp.

In another embodiment of the present invention, a method includes controlling an input switching stage of a power converter to provide power for a lamp. The method further includes controlling the input switching stage of the power converter to modulate a line current supplied to the power converter to carry data related to a state of the lamp.

In a further embodiment of the present invention, an apparatus includes means for controlling an input switching stage of a power converter to provide power for a lamp. The apparatus further includes means for controlling the input switching stage of the power converter to modulate a line current supplied to the power converter to carry data related to a state of the lamp.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A lighting system includes one or more methods and systems to control an input switching stage of a power converter to provide power for a lamp and modulate a line current supplied to the power converter to carry data related to a state of the lamp. In at least one embodiment, a single controller consolidates the functions of controlling an input stage of the power converter and communicating to an external device by modulating the line current supplied to the power converter to carry data related to a state of the lamp. The particular type of current modulation and communication protocol utilized by the consolidated power conversion-communication controller is a matter of design choice. In at least one embodiment, the lamp includes one or more electronic light sources, such as one or more light emitting diodes (LEDs) and/or one or more compact fluorescent lamps (CFLs). In at least one embodiment, utilizing the input switching stage to control power conversion by the power converter and to provide data communication allows power control and communication functions to be consolidated into a single controller and, thus, in at least one embodiment, eliminates a dedicated communication controller.

Figure 1:
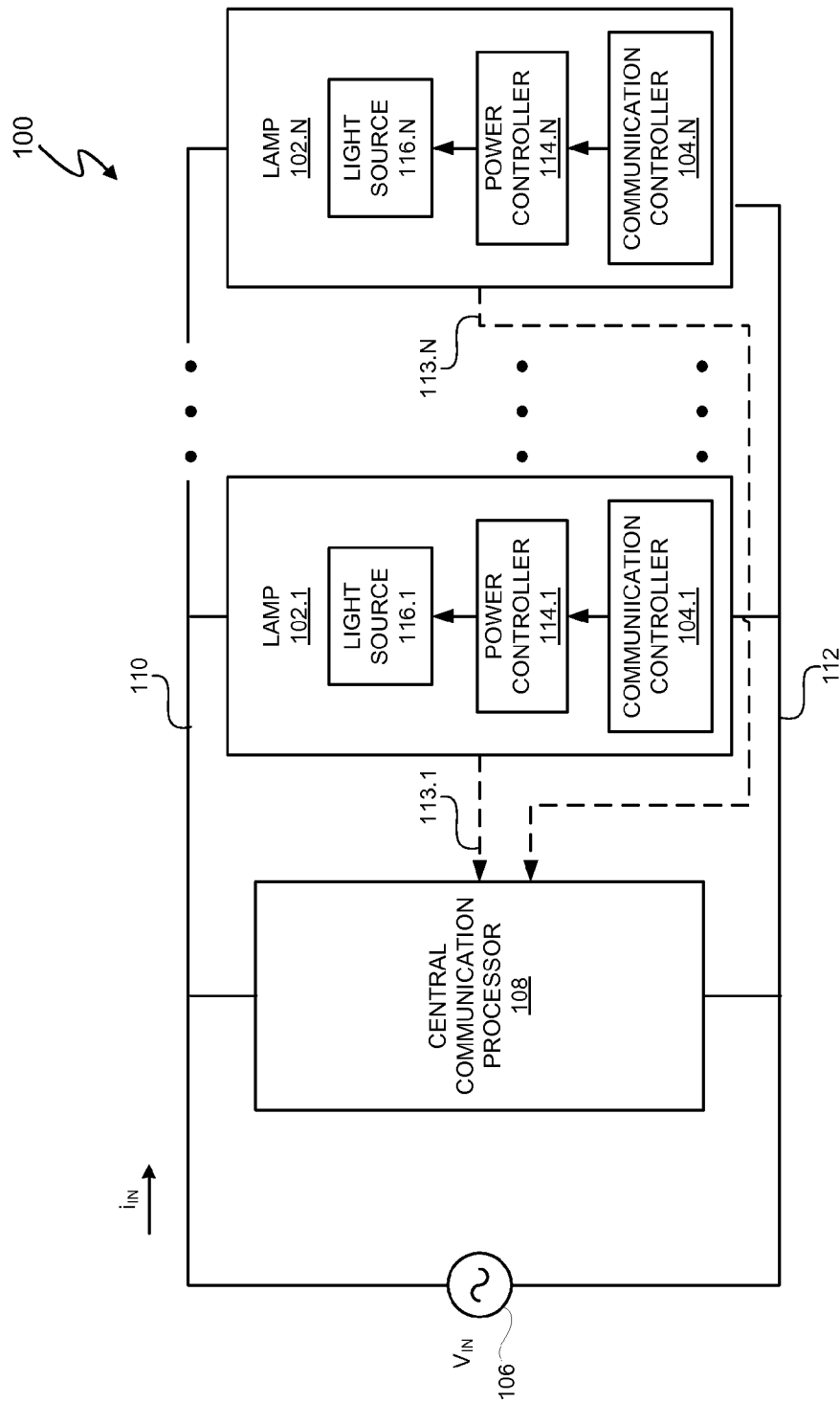
FIG. 1 (labeled prior art) depicts a lighting system that includes communication between lamps and a central communication processor.
Figure 2:
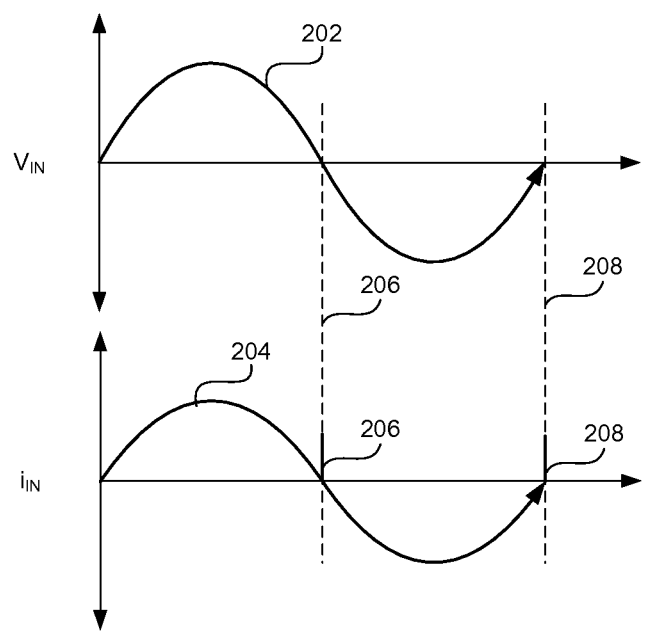
FIG. 2 (labeled prior art) represents an exemplary supply voltage waveform and input current waveform for the lighting system of FIG. 1.
Figure 3:
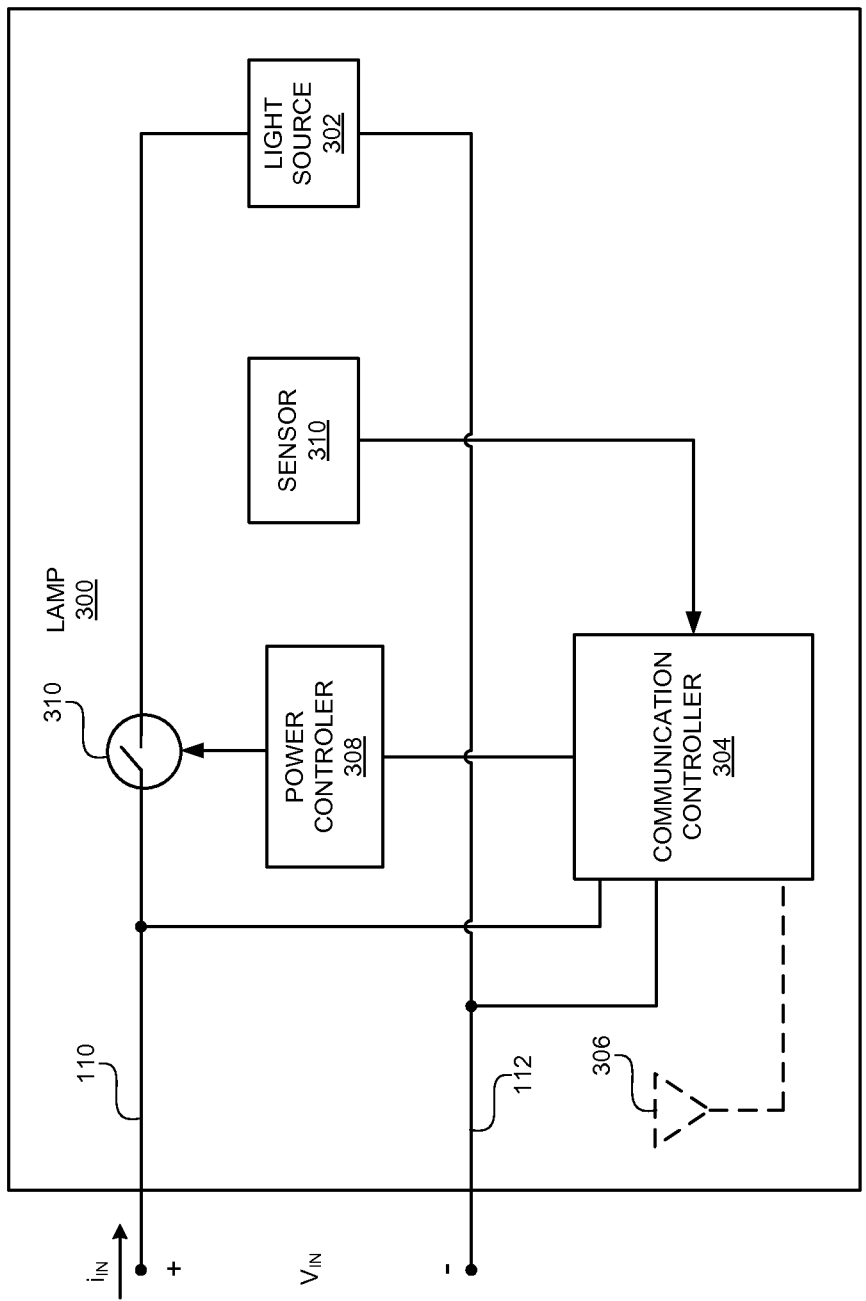
FIG. 3 (labeled prior art) depicts a lamp of the lighting system of FIG. 1.
Figure 4:
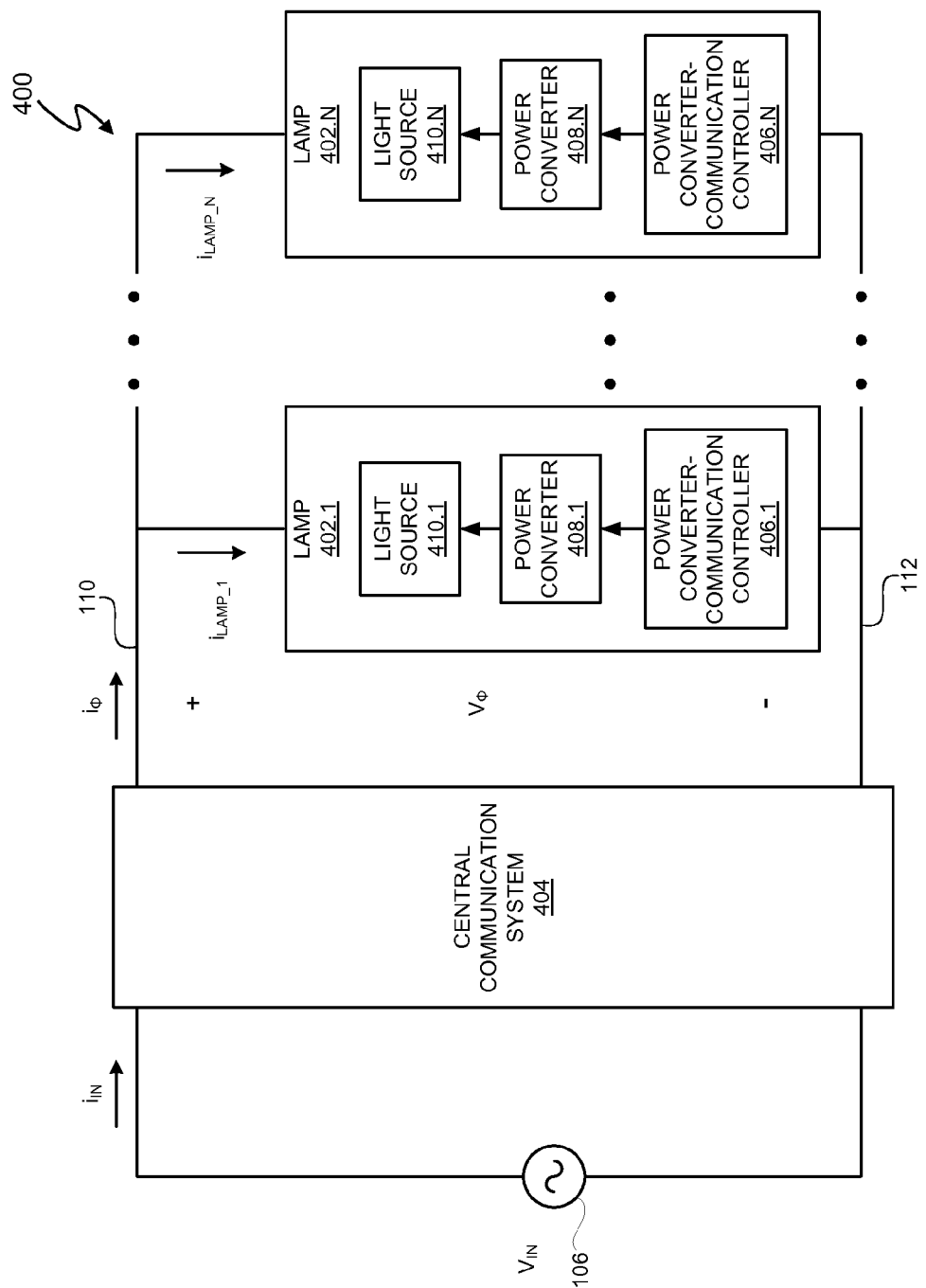
FIG. 4 depicts a lighting system having a controller that controls an input switching stage of a power converter to control power conversion and modulate a line current for communication.

FIG. 4 depicts a lighting system 400 that includes lamps 402.1-402.N. "N" is an index integer representing a total number lamps. The lighting system 400 receives an AC supply voltage $V_{IN}$ from voltage supply 106. In at least one embodiment, the central communication system 404 receives data from lamps 402.1-402.N, and, in at least one embodiment, the central communication system 404 receives data from and transmits data to the lamps 402.1-402.N. In at least one embodiment, the central communication system 404 includes a dimmer (not shown) that phase cuts the supply voltage $V_{IN}$ to generate an input voltage $V_\Phi$. The dimmer can be any type of dimmer, such as a triode for alternating current (triac) based dimmer or an electronic dimmer. In at least one embodiment, the central communication system 404 does not phase cut the supply voltage $V_{IN}$, and the supply voltage $V_{IN}$ equals the input voltage $V_\Phi$.

Each of lamps 402.1-402.N includes one of the respective power converter-communication controllers 406.1-406.N to control power conversion by respective power converters 408.1-408.N and to communicate with the central communication system 404. Power converters 408.1-408.N convert power provided by the input voltage $V_\Phi$ and the respective lamp currents $i_{LAMP\_1}$ through $i_{LAMP\_N}$ into power useable by the respective light sources 410.1-410.N. The lamp currents $i_{LAMP\_1}$ through $i_{LAMP\_N}$ are line currents supplied to the respective power converter-communication controllers 406.1-406.N. The sum of the lamp currents $i_{LAMP\_1}$ through $i_{LAMP\_N}$ equals the total line current $i_\Phi$ provided to the lamps 402.1-402.N. In at least one embodiment, the light sources 410.1-410.N are DC current devices such as one or more LEDs and/or one or more CFLs. Each of power converters 408.1-408.N represents any type of switching power converter, such as a boost switching power converter, a buck switching power converter, a flyback switching power converter, a boost-buck switching power converter, and a Cúk switching power converter.

The power converter-communication controllers 406.1-406.N control an input switching stage (such as input switching stage 504 of FIG. 5) of the respective power converters 408.1-408.N to control power provided to the respective light sources 410.1-410.N. Controlling the input switching stages controls the lamp currents $i_{LAMP\_1}$ through $i_{LAMP\_N}$. Since the total current $i_\Phi$ equals the sum of the lamp currents $i_{LAMP\_1}$ through $i_{LAMP\_N}$, i.e $i_\Phi = \Sigma_{x=1}^{N} i_{LAMP\_x}$, each of the lamp currents $i_{LAMP\_1}$ through $i_{LAMP\_N}$ affects the total current $i_\Phi$. Thus, controlling the respective lamp currents $i_{LAMP\_1}$ through $i_{LAMP\_N}$ through the input switching stage allows each of the power converter-communication controllers 406.1-406.N to individually modulate the total current $i_\Phi$ to both control power conversion and control communication. Thus, in at least one embodiment, the power converter-communication controllers 406.1-406.N can consolidate communication and power conversion control, and a separate, dedicated communication controller is not necessitated by the lighting system 400 to facilitate communication between the lamps 402.1-402.N and the central communication system 404. Furthermore, in at least one embodiment, the existing power converters 408.1-408.N can be used without specialized communication-related modifications to modulate the respective lamp currents $i_{LAMP\_1}$ through $i_{LAMP\_N}$ for both power conversion and communication to the central communication system 404. In at least one embodiment, the central communication system 404 can also communicate to one or more of the lamps 402.1-402N using any communication signaling method and protocol.

Figure 5:
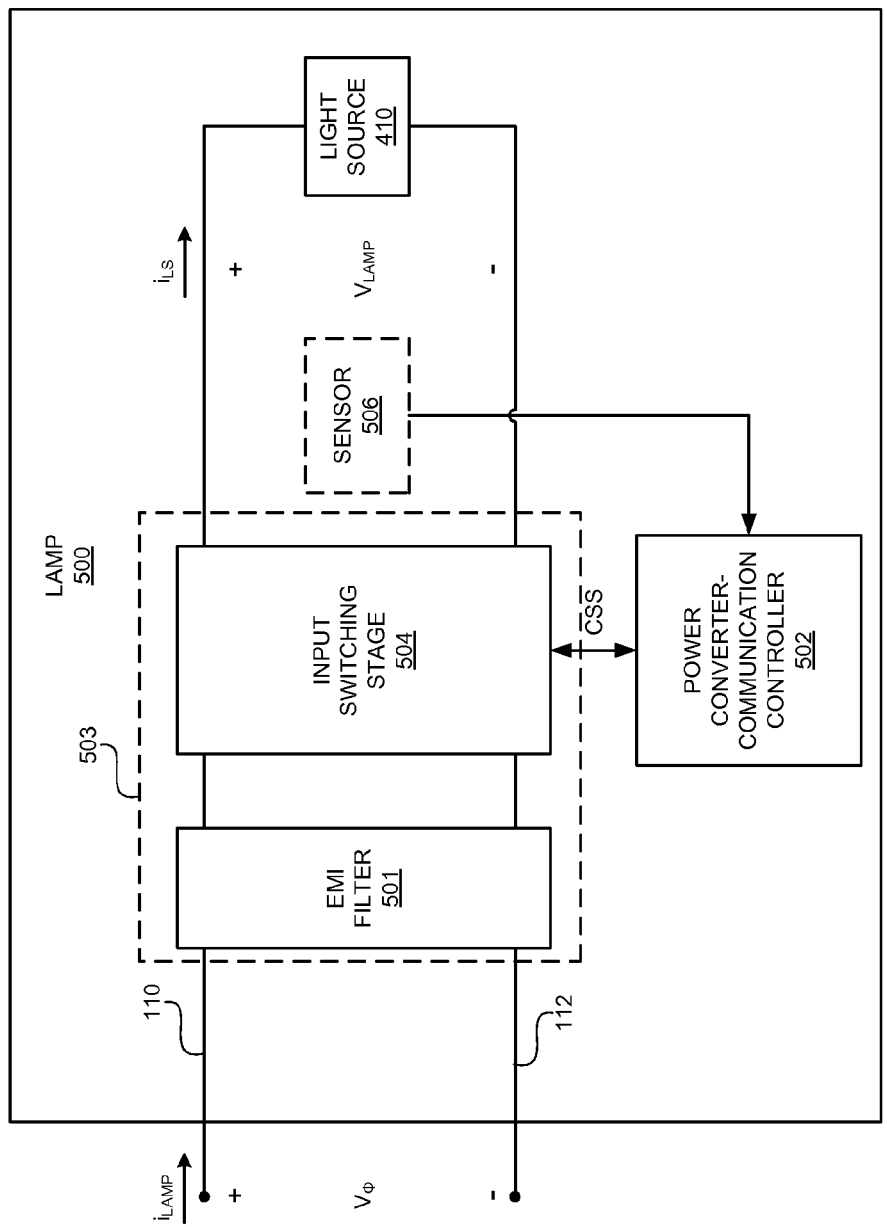
FIG. 5 depicts a lamp of the lighting system of FIG. 4.

FIG. 5 depicts a lamp 500, which represents one embodiment of each of lamps 402.1-402.N. The lamp 500 receives power from the input voltage $V_\Phi$ and the lamp current $i_{LAMP}$ via the power lines 110 and 112. The power converter 503 represents one embodiment of each of the power converters 408.1-408.N. The power converter 503 includes an electromagnetic interference (EMI) filter 501 to reduce EMI of the lamp 500. The power converter 503 also includes an input switching stage 504 to convert the power provided by the input voltage $V_\Phi$ and the lamp current $i_{LAMP}$ respectively into the lamp voltage $V_{LAMP}$ and light source current $i_{LS}$ for the light source 410.

The power converter-communication controller 502 represents one embodiment of each of power converter-communication controllers 406.1-406.N. The power converter-communication controller 502 generates one or more control signals CSS to control the input switching stage 504. Controlling the input switching stage 504 controls the lamp current $i_{LAMP}$ and the light source current $i_{LS}$. The particular system used to control the input switching stage 504 is a matter of design choice. The following U.S. Patent Applications describe exemplary methods and systems for controlling the input switching stage 504:

"Dimmer Output Emulation", U.S. patent application Ser. No. 12/858,164, filing date Aug. 18, 2010, and inventor John L. Melanson (referred to herein as "Melanson I"), "Switching Power Converter Input Voltage Approximate Zero Crossing Determination", U.S. patent application Ser. No. 13/290,032, filing date Nov. 4, 2011, and inventors Eric J. King and John L. Melanson (referred to herein as "King"), "Controlled Power Dissipation In A Switch Path In A Lighting System", U.S. patent application Ser. No. 13/289, 845, filing date Nov. 4, 2011, and inventors John L. Melanson and Eric J. King (referred to herein as "Melanson II"), "Controlled Power Dissipation In A Lighting System", U.S. patent application Ser. No. 13/289,931, filing date Nov. 4, 2011, and inventors John L. Melanson and Eric J. King (referred to herein as "Melanson III"), "Controlled Power Dissipation In A Link Path In A Lighting System", U.S. patent application Ser. No. 13/289,967, filing date Nov. 4, 2011, and inventors John L. Melanson and Eric J. King (referred to herein as "Melanson IV"), and "Constant Current Controller With Selectable Gain", U.S. patent application Ser. No. 13/174,404, filing date Jun. 30, 2011, and inventors John L. Melanson, Rahul Singh, and Siddharth Maru (referred to herein as "Melanson V").

Melanson I-V and King are hereby incorporated by reference in their entireties.

In at least one embodiment, the power converter-communication controller 502 is capable of communicating any desired data to the central communications system. In at least one embodiment, the power converter-communication controller 502 is configured to modulate the lamp current $i_{LAMP}$ using the input switching stage 504 to carry data related to a state of the lamp 500. For example, in at least one embodiment, the lamp 500 includes a sensor 506, such as a temperature sensor. In this embodiment, the sensor 506 senses the temperature of the lamp 500, provides the temperature data to the power converter-communication controller 502, and the power converter-communication controller 502 modulates the lamp current $i_{LAMP}$ to communicate the temperate data to the central communication system 404. In at least one embodiment, the lamp 500 includes a timer (not shown) to measure the ON time of the lamp and/or includes a light sensor to measure ambient light. Thus, in at least one embodiment, the state information that can be communicated by the power converter-communication controller 502 to the central communications system 404 includes one or more of the following: the instantaneous temperature of the lamp, a temperature history of the lamp, an amount of aggregate ON time of the lamp, an amount of current ON time of the lamp, an amount of current supplied to the lamp, amount of ambient light without the lamp, and an amount of time since the lamp was last turned ON.

The communication protocol and line current modulation strategy of power converter-communication controller 502 used to communicate with the central communication system 404 is a matter of design choice. In at least one embodiment, the power converter-communication controller 502 modulates the lamp current $i_{LAMP}$ to generate binary digital signals, i.e. signals representing logical ones and zeros, to communicate with the central communication system 404.

Figure 6:
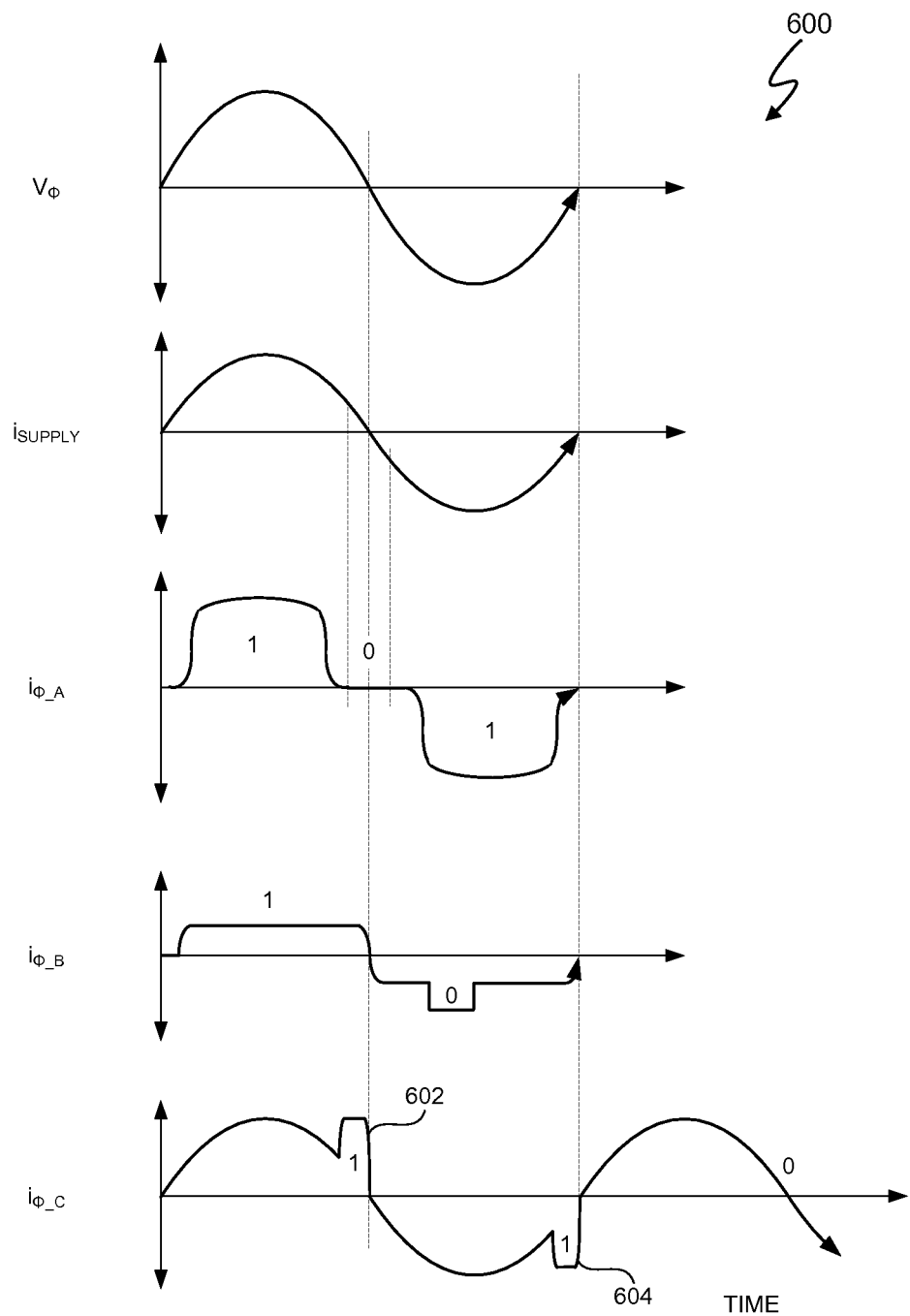
FIG. 6 depicts signal waveforms of the lighting system of FIG. 4 that include three exemplary line current communication schemes.

FIG. 6 depicts signal waveforms 600 that include three line current communication modulation schemes $i_{\Phi\_A}$, $i_{\Phi\_B}$, and $i_{\Phi\_C}$. The modulation schemes represent three, modulated variations of the line current $i_\Phi$. Referring to FIGS. 5 and 6, the input voltage $V_\Phi$ is generally sinusoidal. When not modulating the lamp current $i_{LAMP}$ for data communication, the power converter-communication controller 502 controls the input switching stage 504 to provide power factor correction. Thus, the average line current $i_\Phi$ shown in FIG. 6 approximately tracks the input voltage $V_\Phi$ in phase. In at least one embodiment, the power converter-communication controller 502 modulates the lamp current $i_{LAMP}$ and, thus, the line current $i_{\Phi\_A}$, by modifying the slope of the line current $i_{\Phi\_A}$ and generating an extended zero crossing to respectively generate a logical 1 and a logical 0. In at least one embodiment, the power converter-communication controller 502 modulates the lamp current $i_{LAMP}$ and, thus, the line current $i_{\Phi\_B}$, by modifying the slope of the line current $i_{\Phi\_B}$ and generating a DC offset to respectively generate a logical 1 and a logical 0. In at least one embodiment, the power converter-communication controller 502 modulates the lamp current $i_{LAMP}$ and, thus, the line current $i_{\Phi\_C}$, by generating a pulse 602 that increases an average value of the line current $i_{\Phi\_C}$ during periods when the input voltage $V_\Phi$ supplied to the power converter-communication controller 502 is decreasing to generate a logical 1 and generates a pulse 604 that decreases an average value of the line current $i_{\Phi\_C}$ during periods when the input voltage $V_\Phi$ is increasing to generate a logical 0. In at least one embodiment, rather than generating a pulse 604 to indicate a logical zero, no pulse following one or more predetermined instances of pulse 602 indicates a logical 0. The three line current modulation schemes $i_{\Phi\_A}$, $i_{\Phi\_B}$, and $i_{\Phi\_C}$ are depicted as generating logical 1's and 0's during each half cycle of the input voltage $V_\Phi$, which is, thus, modulating the line current at 2 times the frequency of the input voltage $V_\Phi$. In at least one embodiment, the three line current modulation schemes $i_{\Phi\_A}$, $i_{\Phi\_B}$, and $i_{\Phi\_C}$ modulate every other half cycle, and, thus, modulates the line current at the frequency of the input voltage $V_\Phi$. Thus, in at least one embodiment, the controller 502 is capable of modulating the line current at a frequency within a range of 1 to 2 times a frequency of the input voltage $V_\Phi$. The three line current modulation schemes $i_{\Phi\_A}$, $i_{\Phi\_B}$, and $i_{\Phi\_C}$ are exemplary, and the particular line current modulation scheme is a matter of design choice. Additionally, in at least one embodiment, analog modulation schemes, including frequency modulation and amplitude modulation, can be used to modulate the line current for communication to the central communication system 404.

Referring to FIG. 4, the particular protocol used by the power converter-communication controllers 406.1-406.N to communicate to the central communication system 404 is also a matter of design choice. For example, in at least one embodiment, each lamp 402.1-402.N is assigned a serial number and transmits the serial number to identify a source of data communication to the central communication system 404. In at least one embodiment, each of the power converter-communication controllers 406.1-406.N are configured to modulate the line current $i_\Phi$ to carry data related to a state of respective lamps 402.1-402.N in response to, for example:

one or more of a request by the central communications controller 404 to send data, a predetermined communications schedule, an occurrence of one or more predetermined state criteria such as the occurrence of a predetermined number of lamp ON cycles, a predetermined lamp ON duration, and sensed abnormalities of the respective lamps 402.1-402.N such as a sensed temperature or lamp current above respective predetermined threshold values.

Figure 7:
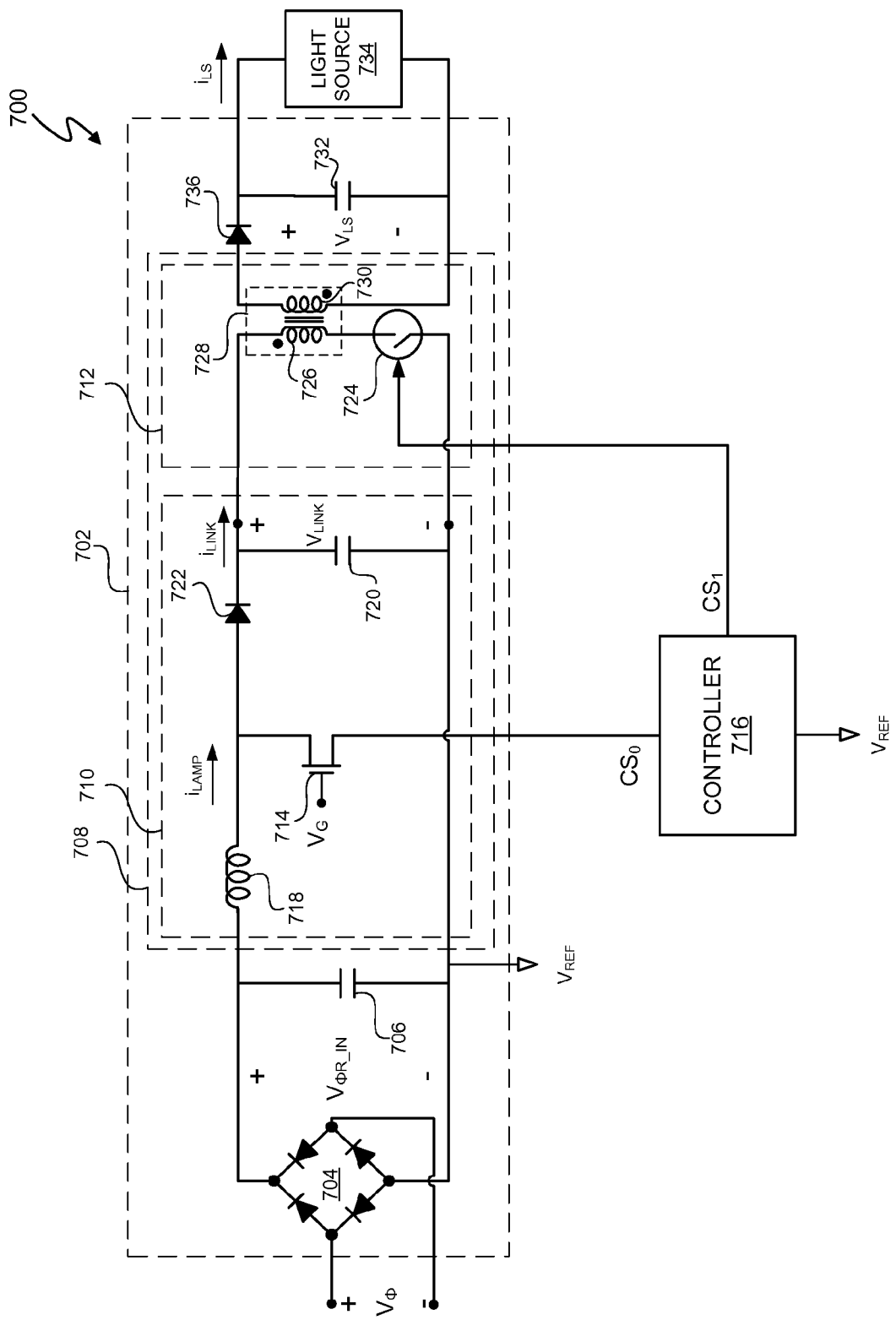
FIG. 7 depicts an exemplary lamp of the lighting system of FIG. 4.

FIG. 7 depicts a lamp 700, which represents one embodiment of lamp 500 (FIG. 5). The power converter 702 is a boost-type switching power converter and includes a full-bridge diode rectifier 704 to rectify the input voltage $V_\Phi$ and generate the rectified input voltage $V_{\Phi R\_IN}$. Capacitor 706 represents the EMI filter 501 and, in general, filters high frequency components present in the rectified input voltage $V_{\Phi R\_IN}$. The power converter 702 includes an input switching stage 708, which includes a boost stage 710 and a DC-DC flyback stage 712. The boost stage 710 includes a source controlled field effect transistor (FET) 714, which has a gate bias voltage of $V_G$. In at least one embodiment, the gate bias voltage is +12V. The power converter-communication controller 716 represents one embodiment of the power converter-communication controller 502. The power converter-communication controller 716 generates a duty cycle modulated control signal $CS_0$ to control the boost stage 710 of the input switching stage 708 and, thus, control the lamp current $i_{LAMP}$. In at least one embodiment, the power converter-communication controller 716 generates the control signal $CS_0$ using the methodology disclosed in Melanson I-V and King. When the control signal $CS_0$ turns FET 714 ON, the lamp current $i_{LAMP}$ energizes the inductor 718. When the control signal $CS_0$ turns FET 714 OFF, the polarity of the voltage of the inductor 718 reverses, and the link current $i_{LINK}$ boosts the link voltage $V_{LINK}$ across the link capacitor 720. The flyback diode 722 prevents current from flowing from the link capacitor 720 into the FET 714.

The power converter-communication controller 716 also generates the duty cycle modulated control signal $CS_1$ to control conductivity of the switch 724 and, thus, control the link current $i_{LINK}$. Controlling the link current $i_{LINK}$ also controls the lamp current $i_{LAMP}$. The link current $i_{LINK}$ energizes the primary side 726 of transformer 728. The secondary side 730 of the transformer 728 transfers power to generate the light source current $i_{LS}$ during a flyback period of the primary coil 726. The light source current $i_{LS}$ charges the light source capacitor 732 to a light source voltage $V_{LS}$ to provide power to the light source 734. Flyback diode 736 prevents reverse current flow from the light source capacitor 732 through the secondary side 730 of transformer 728. The light source 734 is for example, one or more LEDs and/or one or more CFLs.

Because the power converter-communication controller 716 is able to control the lamp current $i_{LAMP}$ using either the boost stage 710 or the DC-DC stage 712 of the input switching stage 708, the power converter-communication controller 716 can control power conversion and modulate the lamp current $i_{LAMP}$ to communicate to the central communications system 404.

Figure 8:
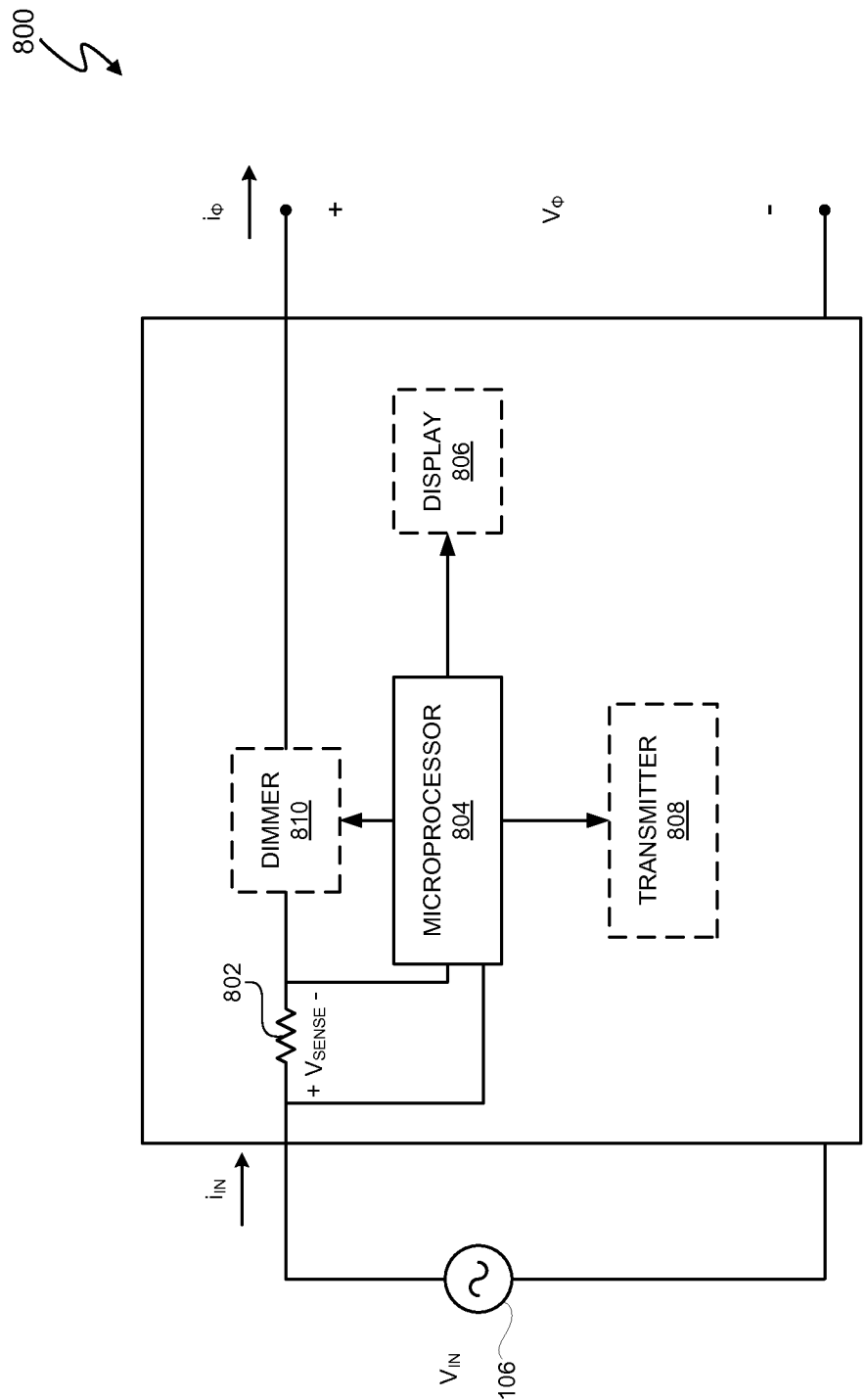
FIG. 8 depicts an exemplary central communication system of the lighting system of FIG. 4.

FIG. 8 depicts an exemplary central communication system 800, which represents one embodiment of central communication system 404 (FIG. 4). The central communication system 800 receives power from the voltage supply 106. The central communication system 800 includes a sense resistor 802, which develops a sense voltage $V_{SENSE}$. The sense voltage $V_{SENSE}$ is directly proportional to the line current $i_{IN}$. Thus, when any of the power converter-communication controllers 406.1-406.N modulate the line current $i_\Phi$ and, thus, modulate the line current $i_{IN}$, the microprocessor 804 detects the modulation of the line current $i_{IN}$ via proportional variations of the sense voltage $V_{SENSE}$. The microprocessor 804 decodes the modulation of the line current $i_{IN}$ and processes the decoded data as desired. For example, in at least one embodiment, central communication system 800 includes a display 806, and the microprocessor 804 causes the display 806 to display information related to the decoded data. In at least one embodiment, the displayed data includes state information about one or more of the lamps 402.1-402.N, warning information, status information, or any other type of information. Exemplary warning information includes over temperature warnings, over-current warnings, and end of life warnings. In at least one embodiment, the central communication system 800 includes a transmitter 808 to transmit the information to an external receiver (not shown). In at least one embodiment, the central communication system 800 also includes a dimmer 810. The type of dimmer is a matter of design choice. In at least one embodiment, the dimmer 810 is a triac-based dimmer that phase cuts the supply voltage $V_{IN}$ to generate a phase cut input voltage $V_\Phi$. In another embodiment, the dimmer 810 is controlled by the microprocessor 804.

Thus, in at least one embodiment, a lighting system includes a controller to control an input switching stage of a power converter to provide power for a lamp and modulate a line current supplied to the power converter to carry data related to a state of the lamp.

Although embodiments have been described in detail, it should be understood that various changes, substitutions, and alterations can be made hereto without departing from the spirit and scope of the invention as defined by the appended claims.

What is claimed is:

1. An apparatus comprising:
   a controller configured to (i) control a switch in an input switching stage of a power converter to regulate current for a lamp to provide power for the lamp and (ii) control the same switch in the input switching stage of the power converter to modulate a line current supplied to the power converter to carry data related to a state of the lamp.

2. The apparatus of claim 1 wherein the power converter is a member of a group consisting of: a boost switching power converter, a buck switching power converter, a flyback switching power converter, a boost-buck switching power converter, and a Cúk switching power converter.

3. The apparatus of claim 1 wherein the controller is configured to utilize current control and direct current (DC) offsets to modulate the line current.

4. The apparatus of claim 1 wherein the controller is configured to increase an average value of the line current during periods when a supply voltage supplied to the power converter is decreasing and decreasing an average value of the line current during periods when the supply voltage is increasing.

5. The apparatus of claim 1 wherein the controller is configured to modulate the line current by modifying a slope of the line current and generating an extended zero crossing.

6. The apparatus of claim 1 wherein the controller is configured to modulate the line current into logical ones and zeros.

7. The apparatus of claim 1 wherein the controller is configured to modulate the line current at a frequency within a range of 1 to 2 times a frequency of an input voltage to the power converter.

8. The apparatus of claim 1 further comprising:
   the power converter coupled to the controller; and
   a light source coupled to the power converter, wherein the lamp comprises the power converter, light source, and controller.

9. The apparatus of claim 8 comprising a plurality of additional lamps, wherein each lamp system comprises:
   a power converter;
   a controller configured to control an input switching stage of a power converter to provide power to the lamp and modulating a line current supplied to the power converter to carry data related to a state of the lamp; and
   a light source.

10. The apparatus of claim 1 wherein the lamp comprises one or more members of a group consisting of: light emitting diodes and compact fluorescent lights.

11. The apparatus of claim 1 wherein the light source comprises one or more light emitting diodes.

12. The apparatus of claim 1 wherein the state of the lamp comprises at least one member of a group consisting of: instantaneous temperature of the lamp, a temperature history of the lamp, amount of aggregate ON time of the lamp, amount of current ON time of the lamp, amount of current supplied to the lamp, amount of ambient light without the lamp, and an amount of time since the lamp was last turned ON.

13. The apparatus of claim 1 further comprising:
a central communications system coupled to the lamp and configured to receiving the line current and decoding modulation of the line current by the controller.

14. The apparatus of claim 13 wherein the central communications controller is configured to display the state of the lamp in a human-interpretable display.

15. The apparatus of claim 1 wherein the controller is configured to modulate the line current to carry data related to a state of the lamp in response to one or more of members of a group consisting of: a request by a central communications controller, a predetermined communications schedule, occurrence of one or more predetermined state criteria, and sensed abnormalities of the lamp.

16. The apparatus of claim 1 wherein the switch is a transistor that controls current in a boost-type power converter.

17. The apparatus of claim 1 wherein the switch is a transistor that controls current in a flyback-type power converter.

18. A method comprising:
controlling a switch in an input switching stage of a power converter to regulate current for a lamp and provide power for the lamp; and
controlling the same switch in the input switching stage of the power converter to modulate a line current supplied to the power converter to carry data related to a state of the lamp.

19. The method of claim 18 wherein the power converter is a member of a group consisting of: a boost switching power converter, a buck switching power converter, a flyback switching power converter, a boost-buck switching power converter, and a Cúk switching power converter.

20. The method of claim 18 wherein controlling the input switching stage of the power converter to modulate a line current supplied to the power converter further comprises:
utilizing current control and direct current (DC) offsets to modulate the line current.

21. The method of claim 18 wherein controlling the input switching stage of the power converter to modulate a line current supplied to the power converter further comprises:
increasing an average value of the line current during periods when a supply voltage supplied to the power converter is decreasing and decreasing an average value of the line current during periods when the supply voltage is increasing.

22. The method of claim 18 wherein controlling the input switching stage of the power converter to modulate a line current supplied to the power converter further comprises:
modifying a slope of the line current and generating an extended zero crossing.

23. The method of claim 18 wherein controlling the input switching stage of the power converter to modulate a line current supplied to the power converter further comprises:
modulating the line current into logical ones and zeros.

24. The method of claim 18 wherein controlling the input switching stage of the power converter to modulate a line current supplied to the power converter further comprises:
modulating the line current at a frequency within a range of 1 to 2 times a frequency of an input voltage to the power converter.

25. The method of claim 18 wherein the lamp comprises a switching power converter, a light source, and a controller for controlling the input switching stage of the power converter.

26. The method of claim 18 wherein the light source comprises one or more members of a group consisting of: light emitting diodes and compact fluorescent lights.

27. The method of claim 18 wherein the lamp comprises one or more light emitting diodes.

28. The method of claim 18 wherein the state of the lamp comprises at least one member of a group consisting of: instantaneous temperature of the lamp, a temperature history of the lamp, amount of aggregate ON time of the lamp, amount of current ON time of the lamp, amount of current supplied to the lamp, amount of ambient light without the lamp, and an amount of time since the lamp was last turned ON.

29. The method of claim 18 further comprising:
receiving the line current; and
decoding modulation of the line current by the controller.

30. The method of claim 29 further comprising:
displaying the state of the lamp in a human-interpretable display.

31. The method of claim 18 further comprising:
controlling the input switching stage of the power converter to modulate the line current supplied to the power converter to carry data related to the state of the lamp in response to one or more of members of a group consisting of: a request by a central communications controller, a predetermined communications schedule, occurrence of one or more predetermined state criteria, and sensed abnormalities of the lamp.

32. The method of claim 18 wherein the switch is a transistor that controls current in a boost-type power converter.

33. The method of claim 18 wherein the switch is a transistor that controls current in a flyback-type power converter.

34. An apparatus comprising:
means for controlling a switch in an input switching stage of a power converter to regulate current for a lamp and provide power for the lamp; and
means for controlling the same switch in the input switching stage of the power converter to modulate a line current supplied to the power converter to carry data related to a state of the lamp.

35. The apparatus of claim 34 wherein the switch is a transistor that controls current in a boost-type power converter.

36. The apparatus of claim 34 wherein the switch is a transistor that controls current in a flyback-type power converter.

* * * * *